United States Patent [19]
Kosmowski

[11] 3,795,455
[45] Mar. 5, 1974

[54] MACHINE TOOL HAVING CENTRIFUGALLY ACTUATED COLLET

[75] Inventor: Wojciech B. Kosmowski, Covina, Calif.

[73] Assignee: Digital Systems, Inc., Arcadia, Calif.

[22] Filed: July 24, 1972

[21] Appl. No.: 274,175

Related U.S. Application Data

[62] Division of Ser. No. 33,844, May 1, 1970, Pat. No. 3,687,467.

[52] U.S. Cl............. 408/239, 90/11 A, 192/103 B, 279/1 C
[51] Int. Cl............................................ B23b 31/08
[58] Field of Search.........408/239, 238, 234, 241 R, 408/139, 140; 90/11 A; 279/1 C; 192/105 BA, 103 B

[56] References Cited
UNITED STATES PATENTS

| 3,703,846 | 11/1972 | Krafft | 90/11 A |
|---|---|---|---|
| 2,602,672 | 7/1952 | Wiard | 192/105 BA |
| 3,587,387 | 6/1971 | Burrows | 90/12 R |

*Primary Examiner*—Gil Weidenfeld
*Attorney, Agent, or Firm*—Edward J. DaRin

[57] ABSTRACT

This disclosure relates to machine tools such as drilling machines particularly adapted for drilling on printed circuit boards and the like. In particular, the disclosure is directed to improvements in centrifugally actuated collets for use with rotatable spindles employed in such drilling machines.

5 Claims, 2 Drawing Figures

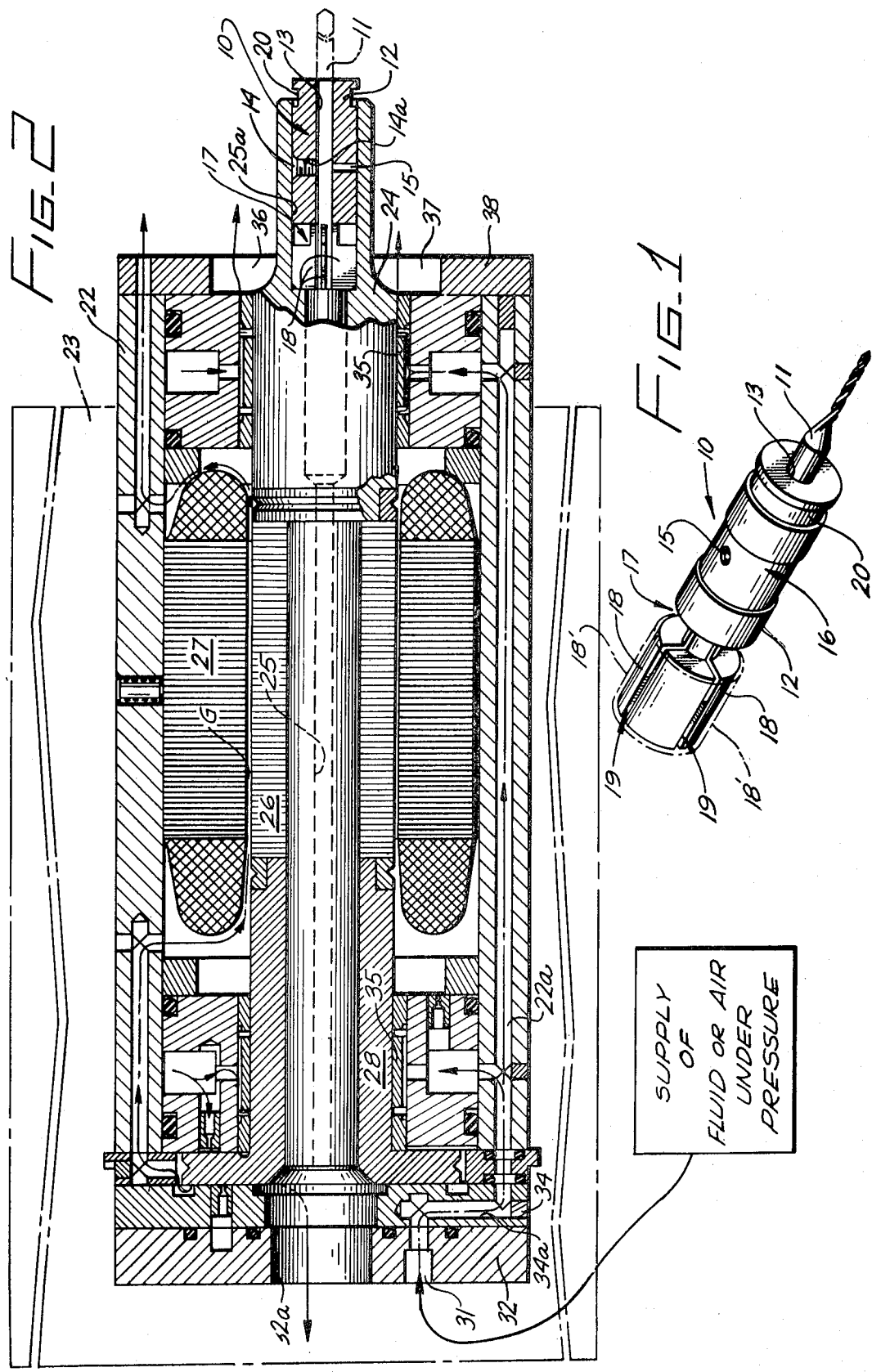

MACHINE TOOL HAVING CENTRIFUGALLY ACTUATED COLLET

This is a divisional application of the application bearing Ser. No. 33,844 filed on May 1, 1970 now U. S. Pat. No. 3,687,467 granted on Aug. 29, 1972, entitled COLLET.

At the present time, there is commercially available drilling machines for drilling holes in printed circuit boards and the like. These drilling machines are presently controlled by means of numerical control circuits and are used to drill the apertures in the printed circuit boards at high rates. One of the problems associated with increasing the producion time of such machines is the time that is presently required to interchange drills of different sizes in accordance with the size of the holes to be drilled. This is particularly true on a multiple spindle machine wherein a multiplicity of drills must be changed. The reason for the relatively large amount of time required to make the drill change can be directly attributed to the design of the present day collets or chucks that are employed for holding the drills in the rotatable spindles of such drilling machines. In addition, when the drilling machines are employed with automatic drill changing apparatus the present day collets require that a cluster of drill configurations be employed with each drilling machine to effect the automatic drill change. The amount of time to effect the drill change and the necessity for a drill cluster introduces the requirement for a suitable quick disconnect collet, for example.

The present invention provides a relatively inexpensive and simple quick disconnect collet of unitary construction that may reduce the drill change time which is on the order of four minutes for the presently available collets to 10 seconds. In addition, the collet of the present invention is suitable for use in automatic tool changers without requiring cluster configurations at each drill position or drilling station. The collet of the present invention can accept drills of varying sizes raging from drill size No. 80 to a 0.187 inch drill as well as accepting shank drills. The collet of the present invention can be readily inserted into the nose of a rotatable drill spindle and maintained in position during drilling without any fasteners or the like. During the static condition of the spindle, the collet of the present invention may be slipped into the spindle and maintained in position without falling out as a result of the spring pressure fit between the collet and the spindle. In the same fashion, the collet can readily be removed from the nose of the spindle for the purposes of changing the drill size or length merely through grasping the exposed end of the collet. In this regard it will be noted that the drill may be inserted into the collet of the present invention and have its length preset before being inserted into the spindle. It has been found that the savings in time required for changing drills effected by the use of the disclosed quick disconnect collet on a 12-spindle drilling machine is 45 minutes. If three drill changes a day are required, a time saving equal to approximately 2¼ hours can be realized so that 32,000 additional holes may be drilled in a production run with the time previously utilized for changing the drill. This saving in time when considered in terms of the increase in production amounts to a 20 percent production increase.

Basically, the collet of the present invention is of unitary construction as distinguished from the multi-piece designs of the prior art. The collet is adapted for ready insertion into the rotatable spindle of a machine tool such as a drill or the like with the collet having an end for securing the tool and the opposite end for insertion and grabbing the rotatable spindle. The collet of the present invention is particularly constructed and defined so that the spindle engaging end of the collet is readily insertable into a rotatable spindle and maintained therein as a result of the fit between the spindle and collet. The spindle engaging end of the collet includes means constructed and defined integral with the collet to be responsive to centrifugal forces generated during the rotation of the spindle so that the means move into tighter engagement with the spindle for securely gripping the spindle and thereby allowing the secured tool and drill to operate on a workpiece.

In a specific embodiment of the collet the centrifugal force responsive means is constructed and defined as a plurality of cylindrical segments constructed integrally with the collet body and defined and supported in a spaced apart relationship at one end thereof. The segments are further characterized as having a spring characteristic for responding to the centrifugal forces so that they can move against the adjacent wall of the spindle and secure the collet within the spindle. This action allows the torque transmitted to the spindle to be transferred to the tool or the drill so that the drill may operate on a workpiece such as a printed circuit board.

Another aspect of the invention is that the collet may be arranged in combination with a head for insertion in a drilling machine or the like, wherein the head comprises a stator assembly including an energizable winding functioning as a stator of the drive motor for the spindle and wherein the spindle has the drive rotor arranged integrally therewith to be responsive to the energization of the stator winding. The stator-rotor assemblies are maintained in rotatable relationship principally through the provision of means for creating an externally pressurized air bearing between the two. The one end of the spindle is adapted for receiving the collet holding the tool and in particular is adapted to receive and hold a collet of the type embodied by this invention.

These and other features of the present invention may be more fully appreciated when considered in the light of the following specification and drawings, in which:

FIG. 1 is a perspective view of the collet embodying the present invention having a drill mounted therein and illustrating the operative position of the spindle grabbing portion of the collet in dotted outline; and FIG. 2 is a cross-sectional view of a drill head with a collet of FIG. 1 mounted therein.

Now referring to the drawings, the collet of the present invention will be examined in more detail. The collet 10 is illustrated with a drill 11 secured in the tool holding end thereof or the right-hand end of the collet as viewed in FIG. 1. The collet 10 comprises a rod-like or cylindrical body 12 for defining a tool holding end and a spindle holding end at the opposite end or left-hand end of the cylindrical body 12. The body 12 is defined with a central bore 13 extending longitudinally therethrough. The central bore 13 accepts a tool such as the drill 11 at the tool receiving end securing end of the body 12. The drill 11 is of conventional construction and is secured to the body 12 by means of a conventional set screw 14 positioned in the aperture 14" drilled through the body 12 to allow the screw to secure the shank of the drill 11 to the collet. It will be noted that only a single fastener 14 is employed for this purpose and that the aperture 15 arranged diametrically opposite the aperture 14 is employed for the purposes of balancing the collet 10 including diametrically balancing thereby maintaining its symmetry throughout. To this same end the portion of the body 12 adjacent the fastener opening 14" is slightly undercut to allow the body to expand as a result of securing the fastener 14 and still not interfere with the fit with the spindle nose. This undercut is illustrated in exaggerated form in FIG. 1 and is identified by the reference numeral 16.

The opposite end of the collet 10 from the tool holding end is constructed and defined with centrifugal force responsive means for movement outwardly of the longitudinal axis of the body 12. For this purpose the collet 10 is defined with a reduced section intermediate its ends and which section is generally identified by the reference numeral 17. The reduced section 17 is defined with an outer diameter reduced from the outer diameter of the body 12 proper but with a greater external diameter than the bore 13, as is best appreciated from FIG. 2. Spaced outwardly from the section 17 towards the left-hand end are a plurality of spaced apart cylindrical segments 18. The cylindrical segments 18 are each defined integral with the body 12 when it is machined to produce the reduced section 17. Each of the cylindrical sections 18 are spaced apart through the provision of longitudinally extending slots, such as the slots identified by the reference numerals 19, and which slots extend completely along the longitudinal edges of the cylindrical sections 18 and communicate with the central bore 13. The cylindrical sections 18 are further characterized as having a spring-like characteristic so as to respond to centrifugal forces generated upon rotation of the collet 10 so that they may move outwardly with respect to the longitudinal axis of the collet to assume a position such as that illustrated in dotted outline in FIG. 1 and identified by the reference numeral 18'. The spring characteristic of the segments 18 when slipped into the spindle also holds the collet 10 in the spindle in the static condition of the spindle without falling out.

A further feature of the collet 10 of the present invention is that as a result of the ease with which it may be slipped into and out of the nose of a rotatable spindle it can be employed for automatic drill changing operations. For this purpose, the arm of the automatic tool may grasp the exposed end of the collet 10 and remove it from its drive spindle through the provision of the undercut section 20 spaced adjacent the drill holding end of the collet 10, as illustrated. This undercut section 20 normally extends outside of the spindle to allow it to be grasped by an automatic drill changing mechanism.

With the above structure in mind the collet as it may be employed with a rotatable spindle operating on an air bearing will be examined with particular reference to FIG. 2. It will be recognized that rotatable spindles for said machine tools are known in the art and in particular static air bearing having electrical stator-rotor assemblies integral with the spindle assembly or head assembly have been disclosed for use with machine tools. One such air bearing head is disclosed in the text entitled "Gas Lubricated Bearings" by Grossom & Powell published in 1964 by Butterworth of London, England. In particular such an air bearing head with a built-in motor is disclosed on page 279 of this text. The head assembly of the present invention employs an air bearing of the type disclosed in the aforementioned text that has been particularly adapted for use in a drilling machine for drilling printed circuit boards and the like.

The drill head comprises a housing 22 that may be readily inserted into the drill proper and which head receiving element is of standard design being diagrammatically represented by the dotted outline identified by the reference numeral 23. The housing 22 contains a rotatable spindle 24 having a longitudinally extending stepped bore 25 extending therethrough including an enlarged section $25^a$ for receiving and holding the collet 10 therein. The spindle 24 includes a rotor assembly 26 mounted thereon intermediate its ends. The rotor assembly 26 conforms to the usual construction for the rotor of a drive motor and is associated with the energizable stator winding 27 spaced opposite thereto and which winding is secured to the housing 22 as illustrated. The rotor 24 also mounts a disc thrust bearing 28 adjacent its inner end thereof. The thrust bearing 28 is necessary to accept the forces transmitted to the spindle when the spindle is employed for the automatic drilling operations. It will be recognized that the operation of the rotor 26 and stator 27 is in accordance with the conventional motor action and accordingly a small air gap, such as air gap G, is provided between the rotor 26 and the stator 27. The action is such that with the energization of the electrical stator windings 27, a magnetic field is created so that the rotor 26 becomes rotatably responsive to the creation of the magnetic field and thereby rotates the spindle 24 along with it.

The remaining portions of the spindle housing 22 are constructed and defined for providing the fluid conduits for conveying a fluid such as air under pressure not only along the gap G between the rotor 26 and the stator 27 but also essentially along the entire length of the spindle to allow the spindle to rotate in the fluid or air bearing created when a supply of fluid or air under pressure exists in these conduits. It should be recognized that the air supplied for the purpose of creating the air bearing also functions to cool the drive motor during rotation of the spindle. The supply of air under pressure is illustrated in block form and is identified by the reference character 30. A manifold from the air supply 30 is diagrammatically illustrated as being connected to the port 31 in an end plate 32 for the housing 22 and through the port 31 the air is conveyed through the manifold $34^a$ defined in the thrust plate 34 spaced inwardly of the end plate 32. The manifold $34^a$ communicates with the longitudinally extending manifold $22^a$ defined within the inner wall of the housing 22. It should be recognized that the air under pressure is conveyed through the gap G by air conduits in the radial bearings 35. The paths of the air are illustrated in FIG. 2 by the arrows. The air is exhausted from the head through the exhaust ports 36 and 37 provided in the bottom plate 38 secured to the collet end of the housing 22. The air is also exhausted through the port $32^a$ provided in the end plate 32. It would be recognized that the fluid bearing will exist in the drill head when the fluid under pressure is applied thereto from the supply 30 whether or not the spindle is rotating.

With the above description, the uniqueness of the collet 10 can be better appreciated. As mentioned hereinabove the collet 10 is maintained within the spindle as a result of the spring force of the segments. In one practical embodiment of the invention the outside diameter of the collet is defined to be in the range of 0.3750 – 0.3749 inch while the corresponding inside diameter of the spindle nose is in the range of 0.37505 to 0.37515 inch. In the same light, when the collet 10 is constructed of a tool steel and to be employed in a drill, the segments 18 should grab when the spindle is operating at approximately 25,000 R.P.M., or greater. It will be appreciated that the collet should be perfectly symmetrical and perfectly balanced throughout to assure proper gripping action of the segments 18.

What is claimed is:

1. A head for a drilling machine comprising a rotatable spindle characterized by a nose having a central aperture for receiving a tool holding collet, a cylindrical collet having one end portion adapted to receive a tool and the other end portion adapted to be slipped into the nose aperture and held therein, the inner diameter of the spindle aperture and the outer diameter of the portion of the collet insertable in the nose are sized for frictional engagement relative to one another to allow insertion of the collet into the spindle nose and to be held therein without fasteners and without falling out when the spindle is in a static condition, including when the spindle is in a vertical orientation, said collet being longitudinally slotted along a portion thereof and having a circumferential groove intersecting therewith whereby radially flexible segments are formed being responsive to centrifugal forces generated during the rotation of the spindle with sufficient flexibility to cause the spindle and the collet to be moved into sufficient gripping relationship with one another to allow the tool and spindle to rotate and operate on a workpiece.

2. A head for a drilling machine as defined in claim 1 wherein the head includes means for creating an air bearing to allow the spindle to be rotatably supported by the air bearing upon rotation of the spindle.

3. A head for insertion in a drilling machine, said head comprising a stator assembly including an energizable winding functioning as the stator of a drive motor for rotating a spindle, a spindle having the rotor of the drive motor mounted intermediate its ends and arranged coaxially with the stator and with the rotor spaced opposite the stator to be magnetically rotatably responsive thereto upon energization of the stator winding, one end of the spindle extending outwardly of the stator assembly and being adapted to receive a collet for holding a tool adjacent one end, the spindle and the portion of the collet received in the spindle being sized for frictional engagement relative to one another so that the collet is held therein without fasteners, the collet being longitudinally slotted along a portion thereof and having a circumferential groove intersecting therewith whereby radially flexible segments are formed being responsive to centrifugal forces generated during the rotation of the spindle with sufficient flexibility to be moved into gripping relationship to allow the tool and the spindle to rotate and operate on a workpiece.

4. A head for insertion in a drilling machine as defined in claim 3 wherein the tool holding end of the collet includes an undercut section adjacent the end and adapted to be positioned outside of the spindle to allow the collet to be readily grasped for removal from the spindle.

5. A head for a drilling machine as defined in claim 1 wherein said tool receiving end portion of the collet has a circumferential groove normally adapted to extend outside of the spindle.

* * * * *